Oct. 28, 1930. W. R. HIGHT ET AL 1,780,014
CONSTANT PERIOD COMPASS
Original Filed Sept. 18, 1928    2 Sheets-Sheet 1

INVENTORS
William R. Hight
Lawrence Wainwright
BY
Herbert H. Thompson
their ATTORNEY.

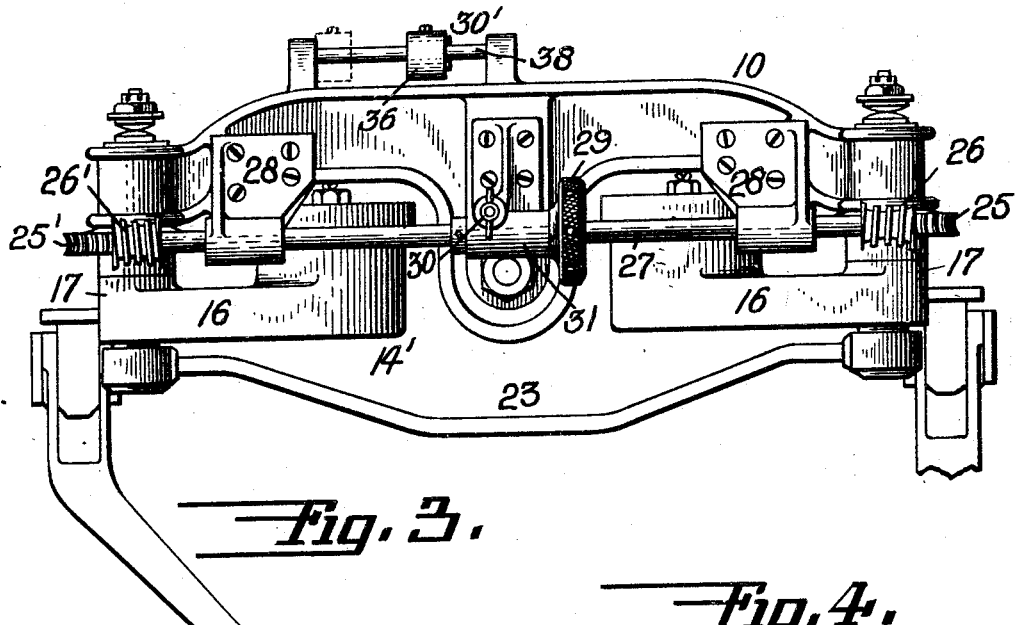
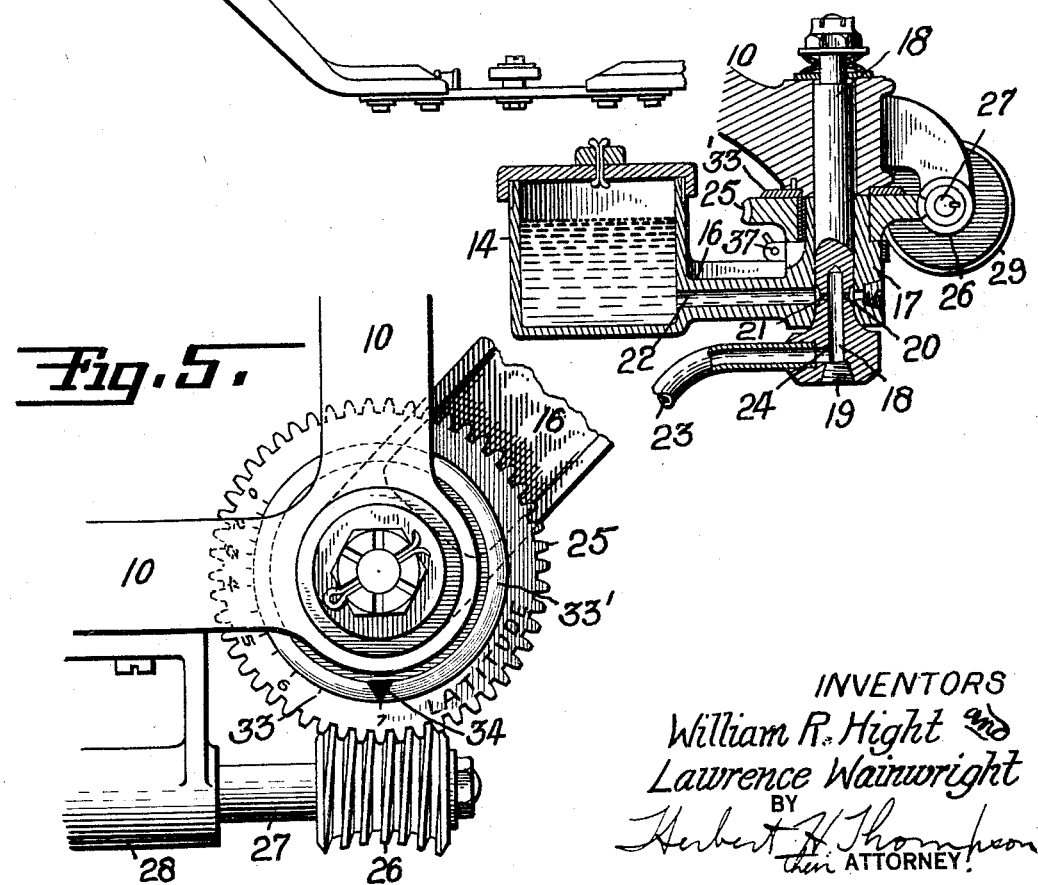

Patented Oct. 28, 1930

1,780,014

UNITED STATES PATENT OFFICE

WILLIAM R. HIGHT, OF HOLLIS, AND LAWRENCE WAINWRIGHT, OF BROOKLYN, NEW YORK; SAID HIGHT ASSIGNOR TO SPERRY GYROSCOPE COMPANY, INC., OF BROOKLYN, NEW YORK, A CORPORATION OF NEW YORK

CONSTANT-PERIOD COMPASS

Refiled for abandoned application Serial No. 306,672, filed September 18, 1928. This application filed July 20, 1929. Serial No. 379,712.

This application is a continuation of a sole application of the party Hight, Serial No. 306,672, filed Sept. 18, 1928, now abandoned.

This invention relates to latitude adjustments for gyroscopic compasses by which the period of the compass may be maintained constant when the compass is operated in different latitudes. More particularly the invention relates to the novel adjustment of the gravitational factor to the above end. Our invention has especial application to a gyroscopic compass in which the gravitational factor is separate from the sensitive element. According to our invention, we movably support the gravitational element or the active portion thereof upon the follow-up element in such manner that the lever arm of said element, as applied to the sensitive element, is varied in accordance with the latitude and thereby the period maintained substantially constant.

Referring to the drawings in which one preferred form of the invention is shown, Fig. 1 is a side elevation, partly in section, of a gyroscopic compass embodying my invention, unnecessary details not relating to the invention being omitted for the sake of clearness.

Fig. 3 is an end elevation of the same.

Fig. 4 is a vertical section through one of the liquid containers which constitute with the liquid therein the active element of the gravitational factor.

Fig. 5 is an enlarged plan view of the pivotal support of one of said liquid containers on the gravitational element.

Figures 1, 2:
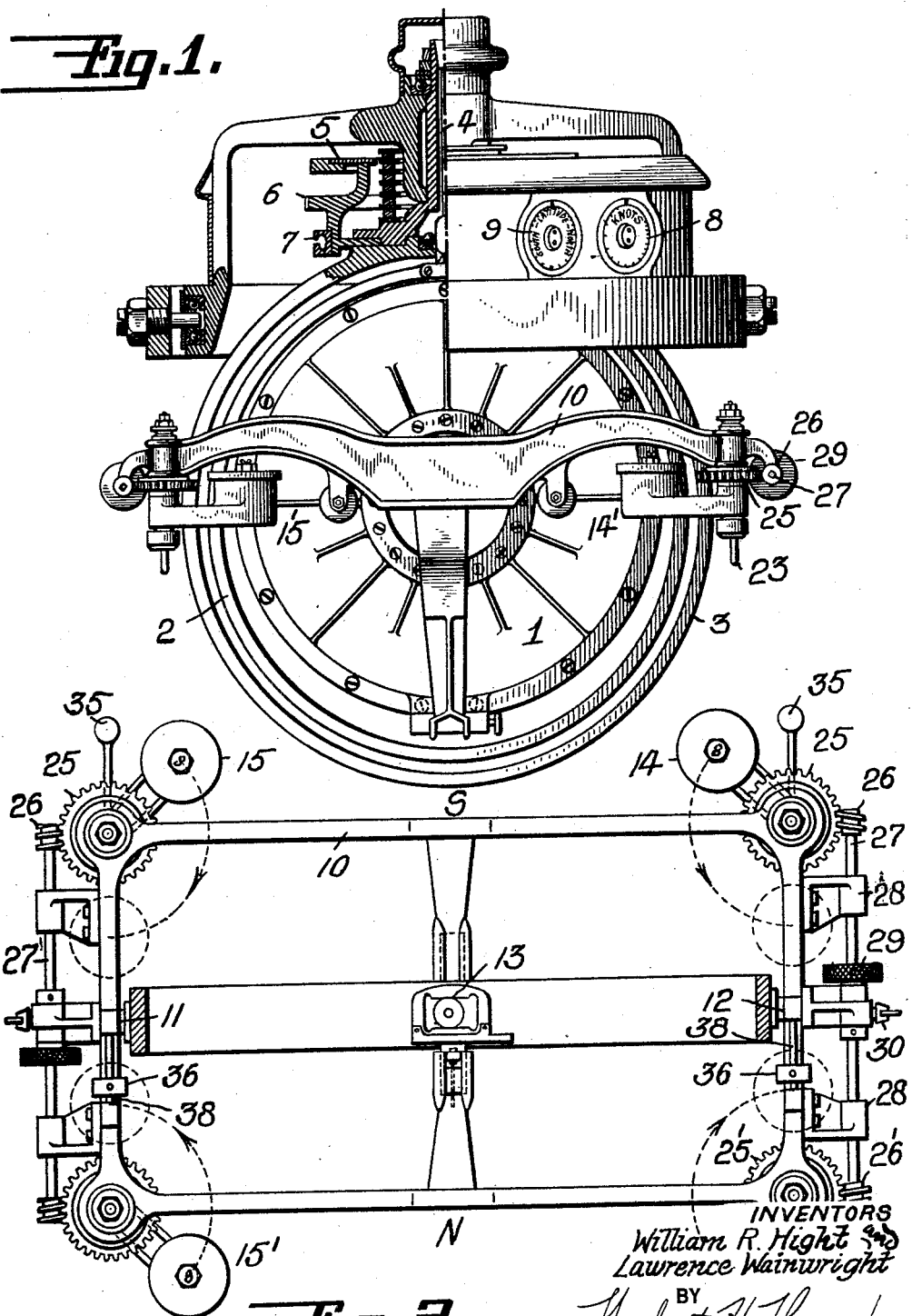
Fig. 2 is a plan view of the gravitational element only as pivoted on the follow-up element.

While our invention is broadly applicable to other types of compasses, we have illustrated the same as applied to the Sperry compass of the liquid control type having the usual sensitive element, comprising the gyro-wheel and its casing 1 and vertical ring 2, and the follow-up element comprising the follow-up ring 3 which supports the sensitive element by the suspension 4. The follow-up element is shown as carrying the usual compass card 5, driving gear 6 by which it is turned from the follow-up motor (not shown), and the cosine cam 7 by which the usual speed and latitude corrections are applied to the readings of the compass, the speed and latitude being set by means of the usual dials 8 and 9 (see Sperry Patent No. 1,255,480, dated February 5, 1918). The gravitational element is shown as in the form of a framework 10 pivoted on the follow-up element at 11—12 and connected by the usual eccentric pivot 13 with the bottom of the gyro casing. On this frame are movably supported what may be termed the active element of the gravitational factor, namely, the liquid containers 14—14' and 15—15'. These containers are shown as positioned on opposite sides of the sensitive element in the north-south direction and are preferably also symmetrically situated in the E-W direction with respect to the center of support of the sensitive element. Each container is shown as pivotally mounted on said frame so as to swing through an arc as shown in dotted lines in Fig. 2 from the full-line position where the gravitational torque is a maximum to the dotted line position where it is a minimum. Means are also provided for interconnecting the units 14—14' and 15—15' of each pair so that liquid may flow there between irrespective of the adjustment of the same. As shown, each container is mounted on an arm 16 having a centrally bored hub 17 at its inner end. Said hub is journaled on a pin 18 secured in an aperture in the framework 10. Said pin is preferably provided with an upwardly extending bore 18' closed at its lower end as by screw plug 19 and having laterally extending bores 20 piercing the same to communicate with an annular channel 21 in the same which leads to a bore 22 in the arm 16, said bore having direct communication with the interior of the liquid container 14. The pipe 23 connecting container 14 to the opposite container 14' is shown as having direct communication with the bore 18' through lateral bore 24.

Means are provided for equally and oppositely adjusting the containers 14—14' and for preventing any other adjustment. For this purpose there is shown a wormwheel 25 secured to the sleeve 17 with which meshes a worm 26 secured to a shaft 27 journaled in brackets 28 on the frame 10. Said shaft is shown as carrying a reversely threaded worm 26' at its opposite end meshing with a similar wormwheel 25' secured to the hub of container 14'. For turning said shaft there is shown a thumb-piece 29. After adjusting, the shaft may be locked in position by means of thumb-screw 30 which clamps split bearing 31 on the shaft. A similar shaft 27' and parts are provided for adjusting the boxes 15—15', it being understood that both pairs of boxes are adjusted at the same time and to the same positions in accordance with the latitude. To this end, a latitude scale 33 or indications are provided to show the proper adjustments for the containers. Said scale is shown as engraved on the top of the wormwheel 25 and is read in connection with an index mark 34 on a disc 33' secured to the frame 10. The graduations on the wormwheel are shown as representing tens of degrees in latitude, the scale being graduated arbitrarily in accordance with the well-known equation between period, the cosine of the latitude and gravitational factor and the fact that the gravitational effect of the liquid in the boxes varies as the square of the distance of the box from the east west axis of support of the compass. The graduations shown extend from zero degree latitude (the equator) to 70° north and south latitude, but obviously the device may be designed for operation in even higher latitudes if so desired by increasing the extent of adjustment of the liquid containers in the north-south direction. It should be observed that by utilizing the two pairs of symmetrically located liquid containers and by moving the individual units of each pair in opposite directions and the two pairs as a whole in opposite angular directions, the dynamic balance of the compass remains undisturbed in spite of the adjustments of the gravitational factor. This is a highly important feature in gyroscopic compass construction as otherwise the compass would have to be rebalanced for every change of adjustment in the gravitational element.

We may also utilize the adjustment of the lever arm of the gravitational factor for an additional purpose, namely, that of keeping the gyroscope level in all latitudes. In compasses of the type disclosed, this purpose has been accomplished in some instances by shifting slightly the pivotal connection between the gravitational element and the follow-up element as disclosed in the patent to Ford and Tanner No. 1,273,799, dated July 23, 1918. According to our invention we do away with the necessity for this extra complication by utilizing the above described adjustments for this purpose also. This purpose may be simply accomplished by securing to the hubs of containers 14 and 15 a movable mass 35, as by a clamp 37 detachably secured around each hub. This mass is preferably so positioned with reference to the arc of movement of container 14 and the scale 33 that while the effective lever arm of the container is varied approximately as the secant of the latitude, the effective lever arm of the mass 35 is varied approximately as the sine of the latitude. It will be understood that the mass, when in its dotted line position on the equator, is balanced by slidable masses 36 on a rod 38 on frame 30 and normally positioned against stop 30'. This adjustment will approximately maintain the compass level in north latitudes. For south latitude navigation, the equatorial setting of the masses 35 should be changed by turning each of said masses around through 180°, first loosening each clamp 37, then rotating the mass and tightening it again so that the radial movement of the mass would be reversed. At the same time the masses 36 are moved to the dotted line position in Fig. 2 to balance the masses 35 when in the zero or equator adjustment.

From the foregoing, it will be obvious that all the navigator need do in keeping the period of the compass the same for changing latitudes is to adjust the latitude dial 9 on the top of the compass by which the correction device applies the proper latitude correction and by adjusting at the same time the position of the liquid containers with reference to the dials 33 for the same latitude. This may also keep the gyroscope level by the use of masses 35 as explained. It is obvious that if desired all of these adjustments may be effected from one point by one and the same operation if desired without departing from the scope of the appended claims.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and other omitted without interfering with the more general results outlined, and the invention extends to such use.

Having described our invention, what we claim and desire to secure by Letters Patent is:

1. In a gyro-compass, the combination with the sensitive element and gravitational factor, of means for varying the effective gravitational factor for maintaining the period constant in different latitudes comprising means for movably mounting said factor and means for altering the position of said factor to vary the effective lever arm beween said factor and element in a N-S direction.

2. In a gyro-compass having a sensitive element and a follow-up element, a gravitational element pivoted on the latter and connected to the former and having liquid containers mounted thereon for adjustment in a N-S direction on opposite sides of said sensitive element, and means for adjusting said containers in said N-S direction in accordance with the latitude.

3. In a gyro-compass having a sensitive element and a follow-up element, a gravitational element pivoted on the latter and connected to the former, two pairs of connected liquid containers pivotally mounted and symmetrically placed on said element, the units of each pair lying on opposite sides of the sensitive element in the N-S direction and the respective containers of opposite pairs being oppositely placed in the E-W direction, and means connecting the units of each pair whereby, in adjusting the position of the containers for different latitudes, the units of each pair are moved equally and oppositely, the two pairs being rotated in opposite angular directions.

4. In a gyro-compass having a sensitive element and a follow-up element, a gravitational element pivoted on the latter and connected to the former and having liquid containers movably mounted thereon on opposite sides of said sensitive element, means for adjusting said containers in a N-S direction in accordance with the latitude, the containers being moved equally and oppositely so as not to later disturb the dynamic balance of the compass.

5. In a gyro-compass having a sensitive element and a follow-up element, a gravitational element pivoted on the latter and connected to the former, a pair of liquid containers, interconnecting means between the same, means for mounting the same on said element so that each can be moved in a N-S direction including liquid-tight joints between the interior of each container and means interconnecting the same, and means for moving said containers in the N-S direction for the purpose specified.

6. In a gyro-compass, the combination with the sensitive element and gravitational factor of means for varying the effective gravitational factor for maintaining the period constant in different latitudes, means for shifting the center of gravity of said factor for keeping the gyroscope level in different latitudes, and a common means for operating said first two means.

7. In a gyro-compass having a sensitive element and a follow-up element, a gravitational element pivoted on the latter and connected to the former and having communicating liquid containers mounted thereon on opposite sides of said sensitive element for movement in a N-S direction, an unbalanced mass secured to the container on one side of the gyroscope, and means for moving said containers and mass in a N-S direction in accordance with the latitude.

8. In a gyro-compass having a sensitive element and a follow-up element, a gravitational element pivoted on the latter and connected to the former and having liquid containers mounted thereon on opposite sides of said sensitive element for adjustment in a N-S direction, means connecting said containers permitting only equal and opposite adjustment in said N-S direction, and means for adjusting said containers.

9. In a gyro-compass having a sensitive element and a follow-up element, a gravitational element pivoted on the latter and connected to the former and having liquid containers mounted thereon on opposite sides of said sensitive element for movement in a N-S direction, means for moving said containers in a N-S direction in accordance with the latitude, and means for locking said containers in the adjusted position.

10. In a gyro-compass, the combination with the sensitive element and gravitational factor, of means for shifting the center of gravity of the latter for keeping the compass level in different latitudes comprising a pair of masses pivotally mounted thereon, and means for swinging the same outwardly but in opposite angular directions for higher north latitudes, means whereby the equatorial setting of the weights may be changed for north and south latitude navigation, and a third mass movable to a position to balance said first masses when in either of its equatorial settings, said swinging means also serving to swing the said pair of masses inwardly and oppositely for higher south latitudes.

In testimony whereof we have affixed our signatures.

LAWRENCE WAINWRIGHT.
WILLIAM R. HIGHT.